July 17, 1962 R. E. OSBORNE ET AL 3,044,863
METHOD AND APPARATUS FOR WASHING AND COOLING CHEESE CURD
Filed Dec. 22, 1959 2 Sheets-Sheet 1

ROBERT E. OSBORNE
MILTON E. POWELL
INVENTORS.

BY

ATTORNEY.

July 17, 1962 R. E. OSBORNE ET AL 3,044,863
METHOD AND APPARATUS FOR WASHING AND COOLING CHEESE CURD
Filed Dec. 22, 1959 2 Sheets-Sheet 2
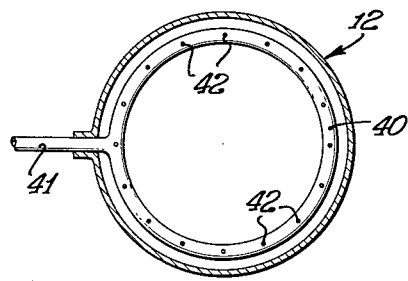
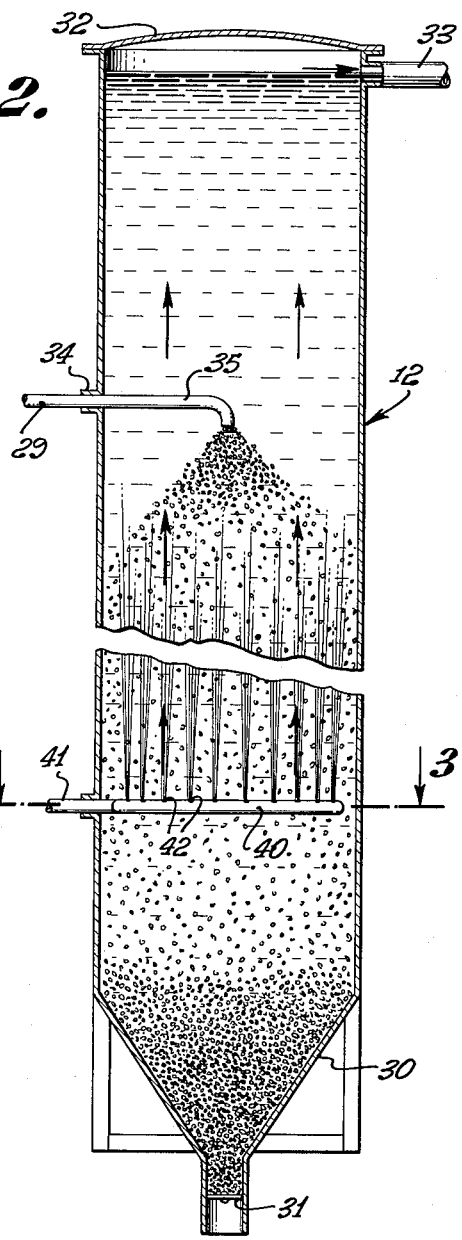
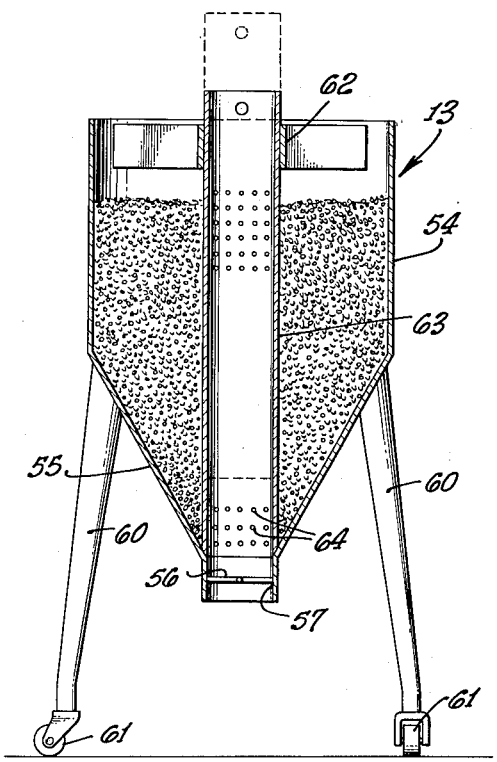
ROBERT E. OSBORNE
MILTON E. POWELL
INVENTORS.
BY
ATTORNEY.

3,044,863
METHOD AND APPARATUS FOR WASHING AND COOLING CHEESE CURD
Robert E. Osborne, Los Angeles, and Milton E. Powell, Glendale, Calif., assignors to Knudsen Creamery Co. of California, Los Angeles, Calif., a corporation of California
Filed Dec. 22, 1959, Ser. No. 861,280
5 Claims. (Cl. 31—89)

This invention relates to the art of cheese making and particularly to the commercial production of cottage cheese curd.

Heretofore, the common practice in commercially producing cottage cheese curd has been to employ a batch process in which skim milk is placed in a conventional jacketed cheese vat; the milk is inoculated with a culture of lactic acid-producing organisms (with or without the further addition of rennet or other coagulating substances) and the acidity is permitted to develop sufficiently to coagulate the liquid skim milk in the vat.

The clabber is then cut with wire cheese knives into cubes ranging in size from ³⁄₁₆ inch to ¾ inch along each edge of the cube.

Following this step, the curds are increasingly heated and gently stirred until they become firmed, and sufficient whey has been expelled from the curds so the moisture content of the latter will not be greater than 80%. At this stage, the whey and curds will have reached a temperature usually between 115° F. and 140° F. Being heavier than the whey, the curds sink to the bottom of the cheese vat.

The next step is to drain the hot whey rapidly from the vat. The curds are then washed and cooled in the vat with from two to four successive additions of progressively colder water. Most of the wash water is drained from the vat before the next succeeding colder wash water is added.

The purpose of washing the curds as above described is to remove the whey entrapped around and within them, and to cool the curds to an appropriate refrigerator temperature. This is essential to the keeping quality of the curds. Furthermore, as the curds are cooled they assume a firmer texture enabling them to withstand the necessary creaming and packaging operations which follow, without the curds breaking up.

The final wash water is usually introduced into the vat at a temperature between 40° F. and 33° F. in order to cool the curd to as low a temperature as is practically obtainable. This having been accomplished, the water is drained as completely as practicable from the vat, leaving only the "dry" chilled curd in the vat. To facilitate this drainage, the curd is usually manually raked to opposite sides of the vat.

It is customary to discard the wash water although the final water contains considerable refrigerant properties. Usually the temperature of the water is below 45° F. when it is discarded. This inefficient use of refrigerated water is relatively costly.

It is an object of the present invention to provide a novel method and apparatus for washing and cooling cottage cheese curd having an improved and more efficient system for utilizing the refrigerant properties of the cooling water.

The removal of the "dry" curd from the cheese vat in the conventional method of making cottage cheese above-described is quite laborious. The curd is scooped up manually with a flat-sided cheese pail and emptied into other containers. Only about 10 to 20 pounds of curd can be scooped up at a time. The amount of labor thus required can be seen from the fact that many cheese vats yield 1500 to 2500 pounds of curd from each batch of milk processed therein.

Another object of the present invention is to provide a novel method and apparatus for draining water from cottage cheese in which the step of manually removing the "dry" curd from the vat is eliminated, thereby effecting substantial savings in the cost of production.

The manner of accomplishing the foregoing objects, as well as further objects and advantages, will be made manifest in the following description taken in connection with the accompanying drawings in which:

FIG. 2 is an enlarged vertical sectional view taken on the line 2—2 of FIG. 1 and illustrating the interior construction and operation of the cheese curd washing and cooling tower of the invention;

FIG. 3 is a cross-sectional view taken on the line 3—3 of FIG. 2;

FIG. 4 is an enlarged vertical cross-sectional view illustrating the internal construction and operation of one of the portable final curd draining hoppers of the apparatus of the invention.

Figure 1:
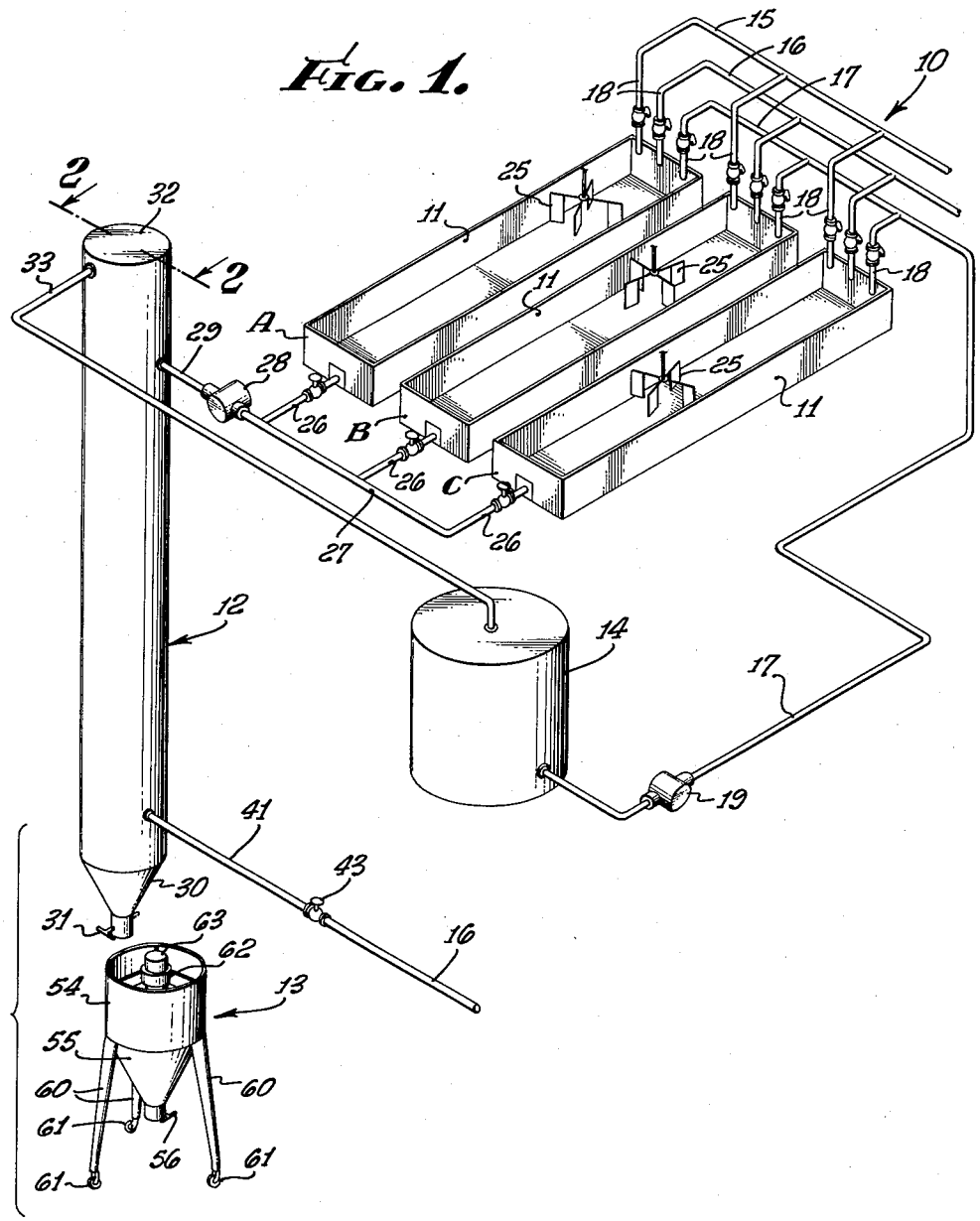
FIG. 1 is a diagrammatic perspective view of the apparatus of the invention.

Referring specifically to the drawings, FIG. 1 illustrates an arrangement of apparatus 10 for manufacturing cottage cheese curd. The equipment embraced by said apparatus includes a series of conventional vats 11, three of which are shown here and identified as A, B and C, and which are used for the production of cottage cheese curd; a final washing and cooling tower 12 of the invention; a portable final curd draining hopper 13; and a tank 14 for storing water from the cooling tower prior to its re-use in the cheese vats.

Production of cheese curd in the vats 11 will be regulated so that the curd in one vat reaches the washing and cooling stage before that in the next vat, whereby a successive production of curd takes place in said vats which creates a continuous operation of washing and cooling said curd in tower 12. The water used for washing and cooling the curd in the vats 11 originates from three sources, namely, the usual domestic water supply for the plant, represented by pipe 15, the refrigerated water supply, represented by pipe 16, and the water from tank 14 (which is accumulated from the outflow of water from cooling tower 12) and which is delivered through pipe 17 to the vats 11.

The delivery of water from pipes 15, 16 and 17 to the vats 11 is controlled by valved delivery pipes 18 which lead from each of the main pipes 15, 16 and 17 to each of said vats. A pump 19 is provided to withdraw water from tank 14 and discharge this under pressure into pipe 17.

Each vat 11 is equipped with a conventional power operated rotary curd mixing paddle 25 which is supported by an overhead conveyor (not shown) for stirring the curd during production of the latter.

Leading from the opposite end of each vat 11, from the end receiving water from delivery pipes 18, is a valved curd discharge pipe 26 through which curd may be withdrawn from said vat, these pipes connecting to a pipe 27 leading to the suction end of a pump 28, the latter having a discharge pipe 29.

The curd washing and cooling tower 12 is cylindrical in form, and may, for instance, be approximately 2 feet in diameter and 30 feet in height. It is to be understood of course that the dimensions of tower 12 may vary widely according to the capacity it is desired this have. Tower 12 is appropriately supported in an erect position and has a conical bottom 30 which terminates axially at its lower end in a curd discharge valve 31. A removable lid 32 is provided on tower 12 to facilitate cleaning. An outflow pipe 33 connects with the upper end of the tower just below the lid 32. The other end of this pipe discharges into the storage tank 14 as shown in FIG. 1. Spaced downwardly from the outflow pipe 33 and opening into the tower 12 is a sanitary pipe coupling 34 with which pipe 29 connects and which in turn connects with a down-curved inlet pipe 35 through which curd is delivered into the tower 12.

Spaced downwardly a substantial distance from the pipe 35 and mounted within the tower 12 a relatively short distance above the tower bottom 30, is a perforated cold water manifold 40 in the shape of a ring, this being connected to a chilled water pipe 41 which enters the wall of the tower 12 to connect with said manifold. Perforations 42 are provided in the manifold 40 in the upper surface thereof so as to direct chilled water discharged from this manifold in an upward direction.

The pipe 41 has a valve 43 and connects with the chilled water line 16.

The apparatus 10 also includes a series of like curd-draining hoppers 13. Each of these has a cylindrical body 54 and conical hopper bottom 55 which terminates at its lower end in a discharge valve 56 having an opening 57 therein of about 6 inches in diameter. Each of the hoppers 13 is supported on legs 60 provided at their lower ends with casters 61 which permit the hopper being readily rolled from one place to another on the floor supporting same. Slidable vertically in an axial collar 62 provided in the upper end of the hopper body 54 is a perforated tube 63. When the tube 63 is allowed to gravitate downwardly the lower end thereof rests on the hopper bottom 55 so as to close the opening 57 and trap any curd contained in the hopper 13 from flowing downwardly out through opening 57. Perforations 64 provided in the tube 63 permit drainage of liquid from the contents of the hopper 55 when this tube is in closed position, this liquid flowing downwardly through this tube and out through the opening 57.

*Operation*

In its preferred embodiment, the method of the invention involves utilizing the cooling tower 12 to perform the final washing and cooling step in the production of cottage cheese curd which was formerly performed in the vats 11. The method involves performance in these vats of the previous steps in the conventional method of producing cottage cheese curd and then transferring the curd from these vats to the tower 12 for accomplishing therein the final cooling and washing step in the production of the cheese curd.

This final washing and cooling step goes on continuously in the tower 12 by providing a sufficient number of vats 11 so that there will always be a supply of cheese curd in one of these vats which has just been completed up to the beginning of the final cooling and washing step and thus be in readiness to be transferred to the tower 12. In FIG. 1 it has been assumed that three of the vats 11 will satisfactorily supply curd for maintaining the tower 12 in continuous operation.

Fresh chilled water is constantly supplied through pipe 41 to the lower end of the tower 12 and an approximately equal amount of water flows out from the upper end of the tower through the pipe 33 into the storage tank 14 throughout the operation of the apparatus 10. The valve 31 at the lower end of tower 12 is of course kept closed except when opened for the purpose of removing curd from the lower end of the tower.

This constant delivery of chilled water through the pipe 41 and perforated manifold 40 into the lower portion of the tower 12 causes a continuous upward current in the water occupying this tower. By manipulation of the valve 43, this current is maintained at a rate of flow which is slower than the rate at which particles of curd delivered into the water occupying the tower 12 will sink in the water owing to the relatively higher density of the curd.

The temperature of successive baths of water to which the curd is subjected in the vats 11 is progressively lower and the method of the invention contemplates making maximum use of the refrigerated water employed in the tower 12 by collecting this in the storage tank 14 and then withdrawing water from this tank and delivering it successively to the vats 11 for use in partially chilling the curd prior to the final cooling.

Let us assume that the batch production cycles have started in vats A, B and C in the order mentioned and curd has reached the stage in vat A where it is ready to be delivered to the tower 12 while the batch cycles in B and C are still uncompleted.

When this occurs, the valve in discharge pipe 26 of vat A is opened and the pump 28 started so that the curd just produced in vat A, while still mixed with a portion of the final washing water applied in this vat to said curd, is sucked out through the outlet pipe 26 of this vat and delivered through pipe 29 into the final cooling and washing tower 12. Any curd remaining in the vat will be flushed into the suction line with water from tank 14.

By the time the curd thus produced in vat A has been completely withdrawn therefrom and delivered to the tower 12, the cheese curd produced in the cycle being performed in vat B is ready to be withdrawn from the latter and delivered to the tower 12. This is accomplished merely by shutting the valve in pipe 26 of vat A and opening the valve in pipe 26 of vat B. In like manner after the curd has been withdrawn from vat B, the curd previously being produced in vat C is ready for withdrawal and this is accomplished by closing the valve in pipe 26 of vat B and opening the valve in pipe 26 of vat C. As the discharge pipe 26 of each of the vats 11 is thus closed following a discharge from that vat of curd produced in a batch operation cycle therein, the vat may be cleaned and sanitized at this time in order to receive a new batch of skim milk.

As above noted, all of the wash water employed in the series of washing baths to which the curd is subjected in batch cycles performed in vats 11 is selectively drawn either from the tap water line 15, the fresh chilled water line 16, or the line 17 which connects with the tank 14.

As clearly shown in FIG. 2, the curd delivered into the tower 12 from the curd inlet pipe 35 sinks and spreads throughout the area of the tower below said inlet pipe as the chilled water delivered into the tower from the manifold 40 flows upwardly through this dispersed curd until the water travels upwardly past the curd inlet pipe 35 and eventually passes out of the tower through the water outflow pipe 33.

The downward gravitation of the curd thus delivered continuously to the tower 12 causes a more or less compact collection of the curd in the lower portion of the tower and particularly in the conical tower bottom 30. As soon as enough curd is collected in the lower portion of the tower 12, and while one of the portable hoppers 13 is located beneath the valve 31 of the tower, as shown in FIG. 1, the valve 31 is opened and the hopper 13 is rotated about its axis so as to uniformly fill this hopper with curd discharged downwardly through the valve 31 into this hopper. When this hopper 13 has thus been filled with curd discharged from tower 12, this hopper is replaced by another identical hopper, and the hopper 13 just filled with curd is rolled on its casters 61 over the floor and into a refrigerator where it is allowed to sit for the length of time necessary for water in the curd to drain outwardly through the perforations 64 and the axial hole 57 in the bottom of the hopper. When the curd in the hoppers 13 thus placed in refrigeration have become dry enough to subject this to creaming and packaging procedures, the valve 56 is closed and the perforated screen 63 is removed. The curd may be creamed at once or stored for use at a later time. Immediately after its being emptied of curd, each hopper 13 is returned to positions of readiness to be refilled in the same manner above described by curd discharged downward through the valve 31 of the tower 12. The perforated tube 63 is of course allowed to drop downwardly to its port closing position shown in FIG. 4 before this hopper is refilled with curd.

Attention is particularly directed to the intimate mingling of the curd with the chilled water in the tower 12 as these counterflow past each other in the major portion of the tower disposed between the curd inlet pipe 35 and the chilled water manifold 40. The warm curd thus discharged into the tower is progressively cooled first by the warmer and then by the colder parts of the rising current of chilled water whereby a high degree of efficiency is obtained in the heat transfer between the curd and the chilled water. It is thus possible to reduce the temperature of the curd in this tower to what is practically a refrigerated temperature by the time it gravitates into the lower end of the tower ready to be withdrawn and transferred to the draining hoppers 13. It is to be understood of course that, although not shown in the drawings, the cooling tower 12 is insulated to prevent an absorption of heat from the atmosphere which would impair the operating efficiency of the tower.

Although the invention is illustrated and described herein as being particularly adaptable to the production of cottage cheese, it is to be understood that, with or without modification, it may be applied to other food uses without departing from the spirit of the invention or the scope of the appended claims.

The claims are:

1. In a method of making cheese curd the steps of confining a body of relatively cold water in the shape of a curd cooling and washing column of water, generating an upward current in said water, said current starting at a level above the bottom of said column, delivering a previously formed cheese curd into said upward current of cold water at a point a substantial distance above said starting level, the velocity of said current being less than the rate at which said curd sinks in said water column whereby said curd sinks below said level and accumulates in the bottom of said column, and withdrawing said curd from the bottom of said column.

2. A method as recited in claim 1 in which said current is effected by introducing fresh cold water continuously into said column at said level and allowing water to overflow from an upper portion of said column above said point at which curd is introduced into said column, forming said cheese curd in a plurality of batch cycles functioning successively so that curd is consecutively delivered from said batch cycles to said point in said water column to maintain the latter in substantially continuous operation, the curd in each of said curd production cycles being washed in a cool water bath just before being delivered to said point in said column, storing said water overflowing from the upper portion of said column and employing said stored water in washing curd in said curd batch production cycles.

3. An apparatus for making cheese curd, comprising: a relatively tall curd cooling tower for confining a column of cooling water, means for introducing cold water into a lower portion of said tower at a level spaced a short distance above the bottom thereof; means for receiving water overflowing from the upper end of said tower; means for effecting the discharge of curd from the bottom of said tower; and means for delivering curd into the column of water confined in said tower at a point below said overflow and spaced a substantial distance upwardly from the level at which water is delivered to the lower portion of said tower.

4. A combination as in claim 3 including a series of curd-producing vats adapted to be operated concurrently, but finishing consecutively, in the production of cheese curd; means for optionally withdrawing the curd produced in any of said vats and delivering the same to said curd washing and cooling tower at the point aforesaid where means is provided for receiving the same; means for storing the water overflowing from said cooling tower; and means for optionally delivering said stored water to any of said curd-producing vats to be employed for washing the curd being produced in said vats.

5. A combination as in claim 3 including a series of portable curd draining hoppers which are successively positioned beneath the bottom of said tower to receive curd permitted to gravitate downwardly from said tower, each such hopper when thus loaded with curd being moved into a refrigerator for draining and refrigerating the curd contained therein, following which the curd is removed from said hopper and the latter returned to its position beneath said tower for receiving another charge of curd.

References Cited in the file of this patent

UNITED STATES PATENTS

| | | |
|---|---|---|
| 252,574 | Burrell | Jan. 17, 1882 |
| 1,266,670 | Fisher | May 21, 1918 |
| 1,475,398 | Kielsmeier | Nov. 27, 1923 |
| 2,132,099 | Doering et al. | Oct. 4, 1938 |
| 2,743,186 | Kraft et al. | Apr. 24, 1956 |
| 2,781,269 | Harper et al. | Feb. 12, 1957 |
| 2,851,363 | Kielsmeier | Sept. 9, 1958 |